United States Patent

Silverman

[15] 3,678,452
[45] July 18, 1972

[54] RECORDING ELASTIC-WAVE PHASE HOLOGRAPHIC DATA

[72] Inventor: Daniel Silverman, Tulsa, Okla.
[73] Assignee: Amoco Production Company, Tulsa, Okla.
[22] Filed: April 30, 1970
[21] Appl. No.: 33,417

Related U.S. Application Data

[63] Continuation-in-part of Ser. Nos. 824,925, May 15, 1969, and Ser. No. 858,635, Sept. 17, 1969.

[52] U.S. Cl.................340/3 R, 73/67.5 H, 340/5 H, 340/15.5 R
[51] Int. Cl........................................G01s 9/66
[58] Field of Search...........340/3 R, 3 F, 5 H, 15.5 DP; 73/67.5 H; 181/0.5 NP

[56] References Cited

UNITED STATES PATENTS

| | | | |
|---|---|---|---|
| 2,364,209 | 12/1944 | Green | 181/0.5 |
| 3,323,105 | 5/1967 | Charske | 340/15.5 DP |
| 3,484,740 | 12/1969 | Cook | 340/5 H |
| 3,506,952 | 4/1970 | Gabor et al. | 340/3 R |

*Primary Examiner*—Richard A. Farley
*Attorney*—Paul F. Hawley and Newell Pottorf

[57] ABSTRACT

In elastic-wave holography where transducers are used to convert the detected elastic waves into corresponding electrical signals, the phase pattern of many transducers spread over the hologram area is recorded by sampling all of the electrical signals during one cycle of the coherent elastic waves to get a relative time delay for the zero-axis crossings of each signal. Pulses at zero-axis crossing times, produced by amplifying, clipping, and differentiating the signals, are then shaped or stretched to form short square waves of time duration M, or phase duration K electrical degrees, where K equals 360°/L, L being the integral number of phase intervals into which the coherent-wave cycle is subdivided. Each value of K also corresponds to one step of the gray scale used in recording the final hologram.

To record the hologram directly or in a form suitable for later playback, all transducer outputs during one coherent-wave cycle are scanned L times, once for each successive K° interval, to detect the square-wave pulses. In each scan, the occurrence times of pulses correspond to those transducer positions in the hologram area having relative phases within the given K° interval. These are accordingly the positions for recording a particular gray-scale density on the final hologram. Succeeding scans detect the positions of different phase and different corresponding density on the hologram, until all phase intervals and hologram density points have been covered.

11 Claims, 6 Drawing Figures

INVENTOR.
DANIEL SILVERMAN
BY Newell Pottoff
ATTORNEY

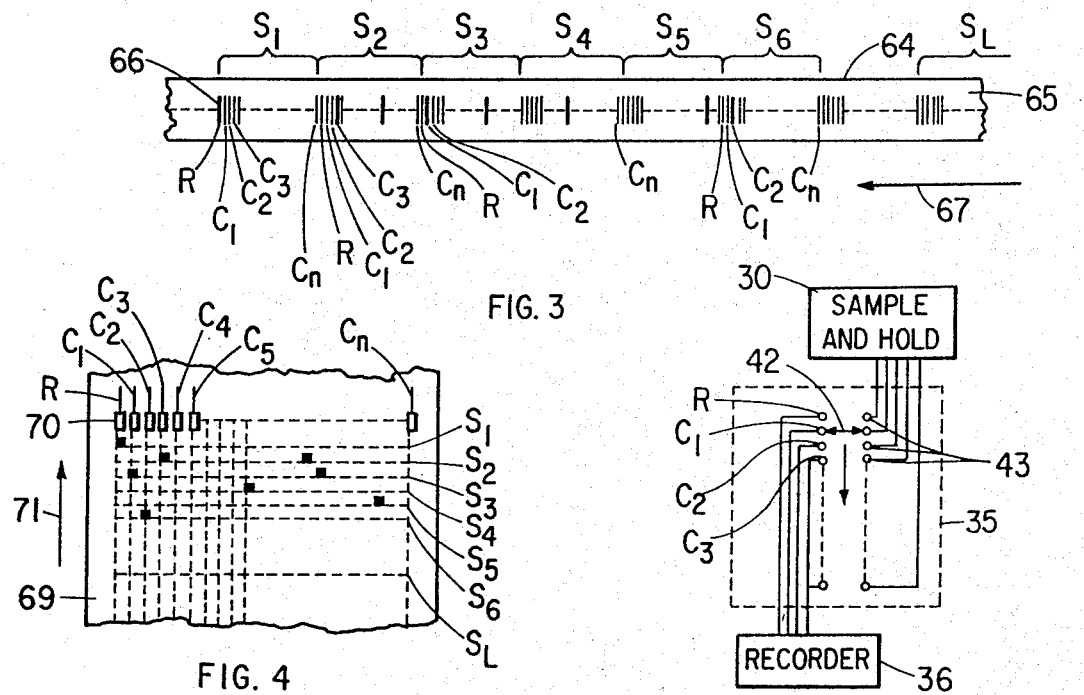

RECORDING ELASTIC-WAVE PHASE HOLOGRAPHIC DATA

CROSS-REFERENCE TO RELATED APPLICATIONS

This invention is a continuation-in-part of my co-pending applications Ser. No. 824,925, entitled "Elastic-Wave Holography Using Reflections," filed May 15, 1969, and Ser. No. 858,635, entitled "Elastic-Wave Holography of Elongated Objects," filed Sept. 17, 1969. It is also related to my issued U. S. Pat. Nos. 3,400,363, 3,450,225, and 3,461,420.

BACKGROUND OF THE INVENTION

1. Field of the Invention

This invention relates to elastic-wave holography and is directed particularly to elastic-wave phase holograms made using a plurality of transducers spread over a hologram area to convert the elastic-wave energy into corresponding electrical signals suitable either for directly recording a hologram or making a reproducible recording from which the hologram can be constructed. In particular, the invention is directed to the very rapid recording of relative phases of a large number of individual transducers.

2. Description of the Prior Art

A hologram may be considered to be a form of interference or standing-wave pattern of the coherent energy redirected to the hologram area by an object or scene to be observed, combined with reference energy received more or less directly from the source, such as via a plane reflector. In elastic-wave holography where transducers are used to produce equivalent electrical signals, an additional option exists to combine the detected and the reference waves when they are in electrical form. This option is ordinarily not available in optical holography.

At any point of a hologram, the recorded intensity is a function of both the phase-angle difference and the amplitudes of the interfering detected and reference waves. It is well known, however, that a quite satisfactory hologram results if the wave amplitudes are neglected and only the relative phase data are recorded, as variations in transparency or gray scale, for example. When the waves being detected are in electrical form and are steady-state waves, it is a simple matter to measure their relative phase by a conventional phase meter or analogous phase-responsive circuit. Such measurements, however, may require a number of cycles and thus an appreciable interval of time for the metering device or circuit to reach a final reading or indication.

In elastic-wave holography, this can be a problem in at least two ways: A very large number of detector points require a substantial length of time for coverage of the detectors one point at a time; and there may be conditions where the phase pattern varies with time so that it is desirable or necessary to record it at a specific or precisely predetermined time. For example, where there may be noise interference due to travel of the elastic waves along two different paths from the irradiating source, which paths have different travel times, adverse effects of the interference can sometimes be avoided by recording the hologram phase pattern when one or more of the interfering noise waves is absent due to its different travel time. Besides the saving in operating time and reduction of interference-wave effects, there may be many other reasons why it is desirable or necessary to record the relative phase of a large number of transducers covering a hologram area in as short a time interval as possible. It may, accordingly, be considered to be a primary object of my invention to provide a novel and improved method and apparatus for phase hologram recording in elastic-wave holography, capable of recording the relative phases of a large number of transducers spread over the hologram area in a very shot time interval, and when recording in reproducible form, utilizing the recording medium with increased efficiency.

SUMMARY OF THE INVENTION

Stated briefly, these and other objects of the invention are accomplished by determining during one cycle of the coherent waves the relative times when the output voltages of all the various holographic transducers pass through zero in a given direction, say from negative to positive. Preferably, this is done by subdividing the coherent wave period into a number of phase intervals, each representative of a corresponding step in a final hologram parameter such as gray-scale density, and finding in which interval the zero-axis crossing occurs for each of the many respective transducer voltage outputs. Thus, each transducer output is amplified to a high level and clipped or limited to produce essentially a reversing-polarity square-wave. Differentiating the square-wave produces a pulse at each reversal corresponding to the zero-axis crossings, those of one polarity being chosen for use and the other alternate ones disregarded. The chosen pulses are then shaped or stretched into brief unidirectional square pulses substantially equal in length or duration to the phase interval. All of the transducer outputs are scanned in order, once for each phase interval, to detect the square pulses indicating which ones, if any, of the transducers in the hologram array have a relative phase within that interval, the times of occurrence during the scan representing transducer positions in the hologram area and thus the positions for corresponding gray-scale density points in the final hologram. Successive scans cover successively different phase-angle intervals until all possible relative phases and all transducer positions have been scanned and indicated.

BRIEF DESCRIPTION OF THE DRAWINGS

In the drawings showing a preferred embodiment of the invention,

FIGS. 3 and 4 represent two alternative forms for reproducibly recording the information produced in the system of FIG. 1;

FIG. 5 shown an alternative form of multiplexing means useful in connection with the recording form of FIG. 4; and FIG. 6 shows diagrammatically a reproducing system for records in the form of FIG. 4, for forming a visual display or hologram.

DESCRIPTION OF THE PREFERRED EMBODIMENT(S)

Figure 1:
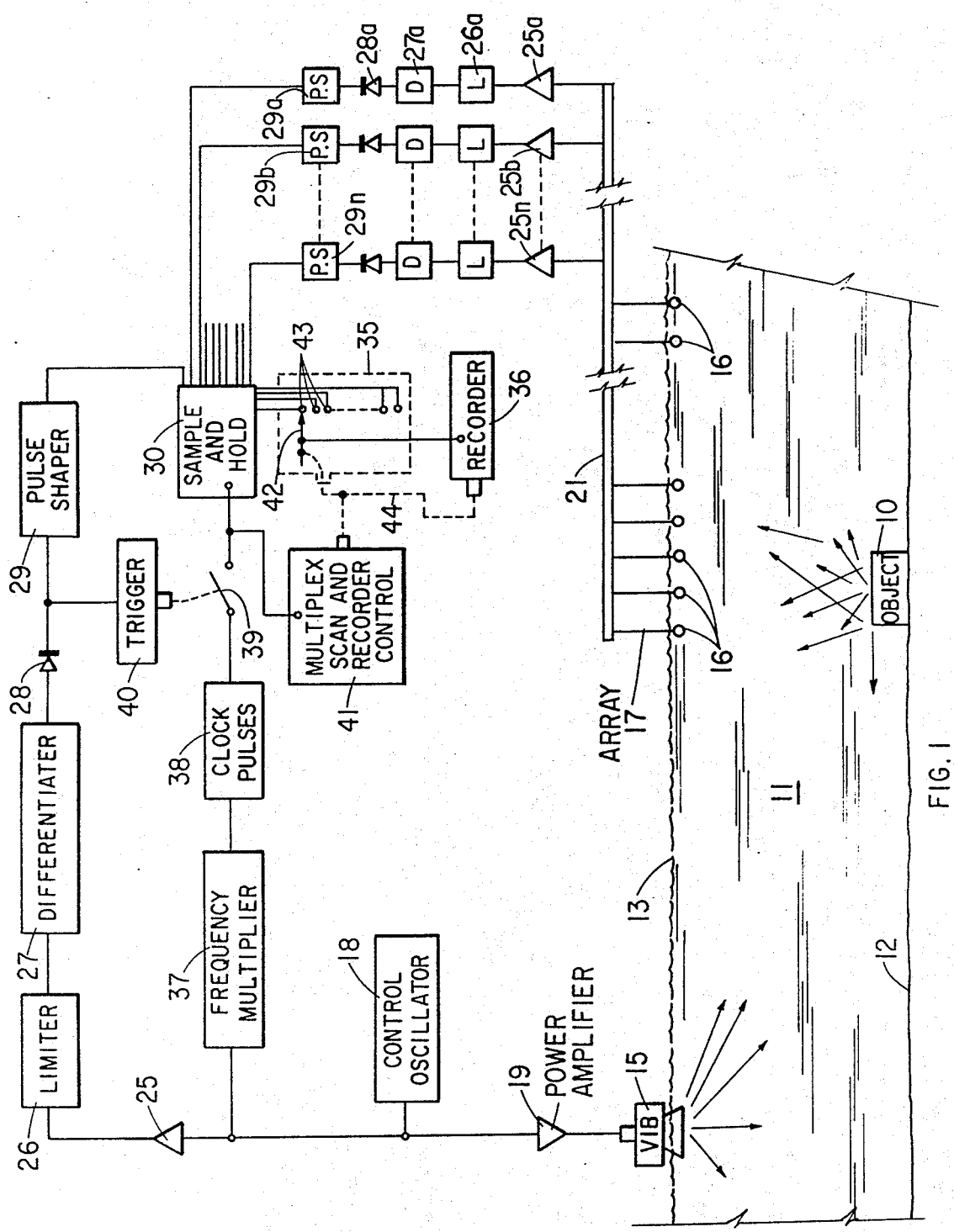
FIG. 1 shows a schematic cross section a marine environment and, in block-diagram form, a typical preferred embodiment of the recording system of the invention.

Referring now to the drawings and particularly to FIG. 1, this figure shows a typical preferred embodiment of the invention applied to sonic holography in a marine environment. An object 10 to be visualized is immersed in water 11 and rests on the marine bottom 12. Arranged at or near the water surface 13 is a vibrator 15 and an array 17 of receivers 16, typically hydrophones, suitably located with respect to source 15 and object 20. Constant-frequency signals generated by a control oscillator 18 are amplified by a power amplifier 19 and drive the vibrator 15 to create in the water 11 coherent elastic or sonic waves. From each point of bottom 12 and of object 10, these coherent sonic waves are reflected and/or scattered, to be received by holographic receiver array 17 and transmitted over a multiple-conductor cable 21 to a recording system embodying the invention.

Elastic-wave holography with the apparatus so far described is fully explained in my U. S. Pat. Nos. 3,400,363; 3,450,225; and 3,461,420. It should also be understood that the explanation of the present invention in terms of sonic holography in water is only by way of example, as it is applicable to virtually any form of elastic-wave holography, such as acoustic or seismic. The invention comes into operation during recording, when a reference signal from the oscillator 18 is transmitted to an amplifier 25, a limiter 26, a differentiator 27, a rectifier 28, and a pulse shaper 29, in series, and placed in a sample-and-hold 30 at the desired time for making a phase-pattern measurement. Likewise, each of the $n$ signals from the $n$ transducers 16 of array 17 is similarly transmitted to sample-and-hold 30 via a separate channel, as is typified by the amplifier 25a, the limiter 26a, the differentiator 27a, the rectifier 28a, and the pulse shaper 29a, connected in series between the appropriate lead of cable 21 from one holographic detector $a$ and the input terminal of sample-and-hold 30. Thence, a multiplexer unit 35 scans the samples held in unit 30 and transmits them for reproducible recording by a recorder 36.

The action of sample-and-hold 30, multiplexer 35, and recorder 36 is synchronized with the coherent exciting signal of oscillator 18 by transmitting the oscillator signal to a frequency multiplier 37 and thence to a clock-pulse generator 38, which produces control impulses at the designated multiple $L$ of the frequency of oscillator 18. Through a switch 39 controlled by a trigger 40 actuated from the output pulse of rectifier 28, clock pulses 38 are transmitted to control the operation of sample-and-hold 30, as well as of a multiplex scan and recorder control unit 41 that coordinates by a mechanical connection 44 the scanning, by a multiplex contactor 42, of the output point 43 of sample-and-hold 30, with the recording by recorder 36 of the multiplexed signals.

Figure 2:
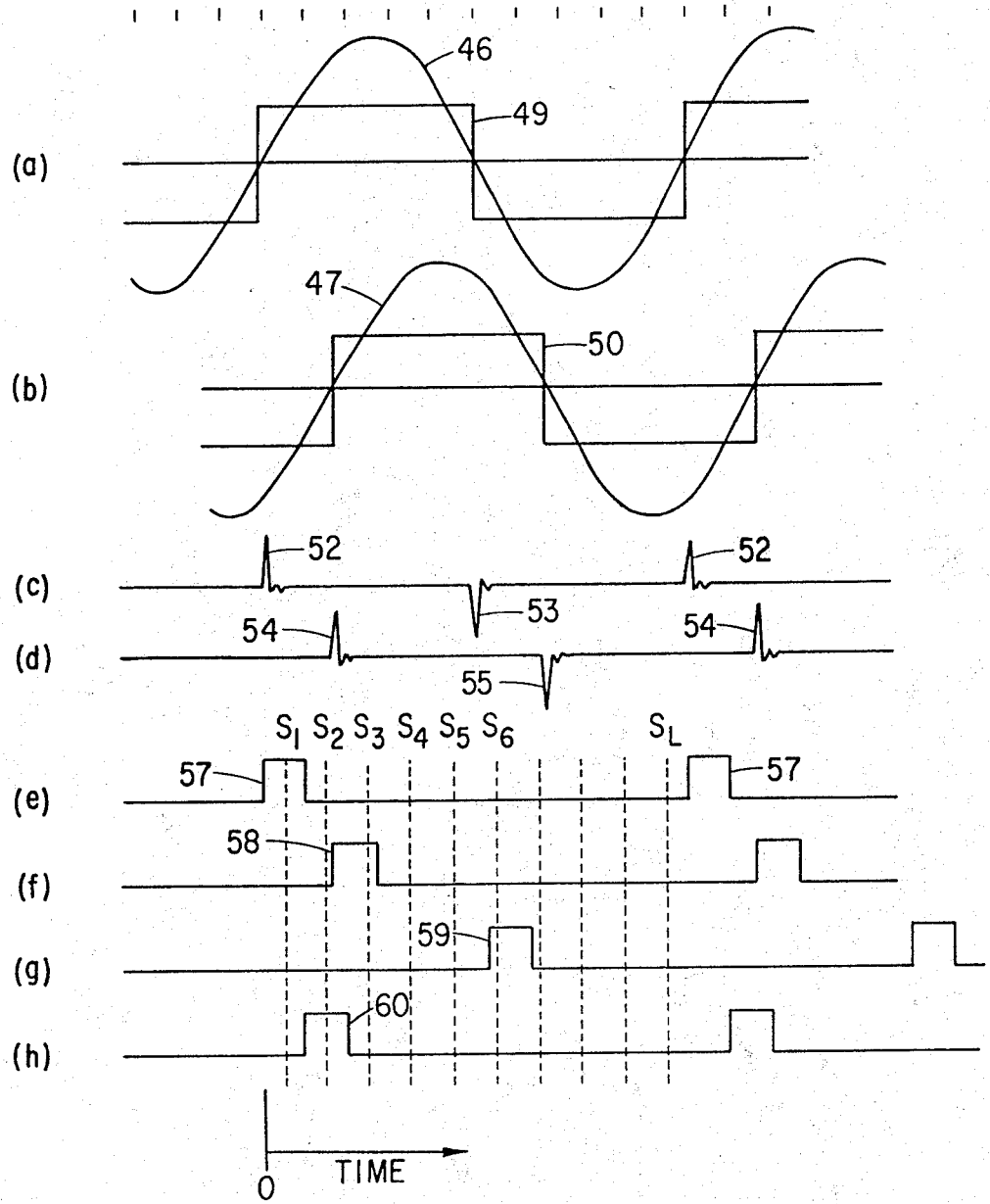
FIG. 2 presents graphs of the wave shapes and relationships involved in the invention and occurring at various points in the circuit diagram of FIG. 1.

The operation of this embodiment of the invention will now be explained by reference to both FIGS. 1 and 2. The various lines of the latter figure designated (a), (b), and so on, are time functions of wave forms present at various places in the system of FIG. 1, assuming time to run from left to right on FIG. 2 from a time-zero origin as shown at the bottom of the figure. Line (a) is thus a sine wave 46 representing the output of oscillator 18 going to amplifier 25 and limiter 36, the square-wave 49 of line (a) being the corresponding limiter output, assuming the wave form 46 to be amplified to very large amplitude in 25 before truncation to the form of square-wave 49. Pulses 52 and 53 of line (c) appear at the output of differentiator 27 acting on square-wave 49, the rectifier 28 preventing transmission of the negative pulses 53 while transmitting only the positive pulses 52 to the pulse shaper 29. There the brief impulses 52 are converted to the square-wave pulses 57 on line (e) of precisely chosen length. This length is selected to be a definite fraction $1/L$ of the total wave period $T$, the denominator of which fraction is the factor of frequency multiplier 37. That is, on the basis that one period $T$ of wave 46 represents 360° of phase, the length of square pulse 57 is $K° = 360°/L$, there being a total integral number $L$ of such $K°$ intervals in the period $T$. Expressed as time in units of the period $T$, $K°$ of phase is equivalent to $M$ seconds where $M = T/L$. It is the function of this recording system to record the relative phase of the output of each detector 16 in units of $K°$, there being a definite value of gray-scale step associated with each unit value of $K$ in the final display or hologram.

Thus, the output of each detector is subjected to the same operations as the output of oscillator 18, line (b) showing the sinusoidal wave form 47 and corresponding square-wave 50 that may be considered to represent the signal of that one of detectors 16 transmitted through the amplifier 25a, limiter 26a, differentiator 27a, rectifier 28a, and pulse shaper 29a to sample-and-hold 30. Line (d) corresponds to the output of differentiator 27a, rectifier 28a cutting off negative pulses 55 and transmitting only the positive pulses 54. Line (f) is the output of pulse shaper 29a, the square-wave pulse 58 representing approximately, though not exactly, a relative time delay between the waves 47 and 46 of two $K°$ units of phase. Square-wave pulses 59 and 60 on lines (g) and (h) may be regarded as representing the respective outputs of pulse shapers 29b and 29c in two other detector channels. These signal channels are all either in phase with the reference signal or are out of phase therewith by varying amounts, and it is the purpose of this invention to determine these amounts in terms of the nearest integer multiple of the phase angle unit $K$.

Furthermore, this is to be done within one cycle of the frequency of oscillator 18. The action is initiated by the pulse 52 of reference wave 46 at the output of rectifier 28, which pulse actuates trigger mechanism 40 to close the switch 39 during one cycle of the reference, the succeeding pulse acting to reopen switch 39. Clock pulses from unit 38, accordingly, are transmitted to sample-and-hold 30 and to the control unit 41 to cause recording of the phases by recorder 36 during the desired recording interval. The first clock pulse, which is synchronous with pulses 52 and 57 of the reference wave 46, actuates sample-and-hold 30, preferably at a time $M/2$ after one-half of a phase-angle interval $K°$, to place on the multiplexer contacts 43 voltage indications of the presence of reference pulse 57 and of any other of the signal pulses within the phase-angle interval $K°$ preceding it. This first sample corresponds, on the time scale of FIG. 2, to the vertical dashed line labeled "$S_1$". One phase-angle interval $K°$ later at time $3M/2$, a second sampling $S_2$ is made of all channel outputs. In the time interval $M$ between the $S_1$ and $S_2$ samples, the control unit 41 has caused the contactor 42 to scan all of the contacts 43 of multiplexer 35 and the pulse 57 plug any others encountered are stored by recorder 36. The second sampling $S_2$ encounters and records the pulse 60 on line (h) representing the time (phase) delay of the signal on the third or $c$ detector channel. The next sampling $S_3$ finds pulse 58 for the first or $a$ detector channel, while the sixth sampling $S_6$ finds the pulse 59 for the second or $b$ detector channel. It is not essential that $S_1$ occur exactly at time $M/2$ in the center of pulse 57 as that pulse will be indicated by any scan falling within the pulse duration. It is important, however, that the successive scans $S_1$-$S_L$ be uniformly spaced $M$ seconds ($K°$) apart.

The output of multiplexer 35 can be recorded in any of a great many different ways, two of which are shown in FIGS. 3 and 4, the latter constituting a preferred embodiment. Thus, as appears in FIG. 3, the results of each successive sampling $S_1$, $S_2$, and so on, are recorded as a single track 65 on a narrow magnetic tape 64, the direction of movement of the tape relative to the recording head being as indicated by the arrow 67. A magnetic mark, such as 66 corresponding to the reference pulse 57 in sample $S_1$, indicates which channels have substantially zero relative delay compared to the reference and thus designate the first gray-scale step. Sample block $S_2$ shows the magnetic mark associated with pulse 60 of FIG. 2, while sample $S_3$ shows the occurrence of pulse 58 associated with channel 1. The position of each magnetic mark 66 within the recorded sample interval block thus corresponds to a given detector position in array 17, while the particular sample interval between 1 and L designates the associated gray-scale step. Gaps (not shown) could, if desired, be inserted in the track 65 between successive blocks of sample data to help differentiate the successive samples.

In the preferred arrangement shown in FIG. 4, a wide magnetic tape 69 travels past an array of recording heads 70 extending in the transverse tape direction, the direction of movement of the tape relative to array 70 being as designated by arrow 71. As is indicated on the right side of the figure, this results in placing the successive sample intervals $S_1$, $S_2$, and so on, along parallel lines extending transversely across tape 69 rather than in sequential blocks as in FIG. 3. As shown in FIG. 5, by arranging for contactor 42 to connect each of the heads of array 70 in succession at the same time that it sweeps the contact points 43 of multiplexer 35, the recorded magnetization pattern of FIG. 4 is obtained. That is, positions across the tape transversely correspond to detector positions in array 17, while distance along the length of the tape 69 corresponds to increasing relative phase angle.

It may be noted that, while there are $L$ phase-angle intervals of $K°$ in one cycle of the fundamental frequency 46, there are only about $L/2$ gray-scale steps for the reason that the maximum relative phase occurs for a phase angle of 180°, and 360° of phase is the same as 0°. That is, if 0° or 360° corresponds to transparency or white on a variable-density hologram presentation, then 180° corresponds to black or opacity. Relative phases of 90° and 270° have the same intermediate shade of gray or partial transparency between the ends of the scale. It should be apparent also that the illustrative magnetization pattern of FIG. 4 is that which actually occurs after the tape has passed underneath recording head array 70 moving in the direction of arrow 71.

One apparatus suitable for producing an optical hologram of the data recorded on the tape 69 is shown in FIG. 6. The magnetic heads of array 70 now function as reading heads for the recorded magnetic pulses on the tape 69 passing in the direction of arrow 71 underneath array 70. The reading head of reference channel R is connected to a sawtooth voltage generator 74 which functions as the voltage supply to the intensity electrode 75 of a cathode-ray tube 76, as determined by a beam on-off switching unit 77. The remainder of the heads of array 70 are connected to a corresponding array of contacts 79 adapted to be scanned by a contactor 78 to transmit actuating pulses to the switching unit 77 when a pulse is encountered during the contactor scan. A second contactor 80 movable in synchronism with contactor 78 scans along a corresponding contact array 81 which taps off varying voltages from a potentiometer 82 energized by a battery 83. The voltage of contactor 80 is transmitted to beam-positioning electrodes 84 of tube 76, it being understood that a second potentiometer and set of contacts (not shown) can similarly supply voltage to the orthogonal beam-deflection plates 85. The resulting pattern of varying intensity over the face of tube 76 can be recorded as an optical hologram on film by the camera 86.

The action of the playback apparatus of FIG. 6 is as follows: as the tape 69 passes under the array of heads 70, the magnetic mark in track R generates a voltage pulse which starts the operation of sawtooth generator 74. Simultaneously, contactors 78 and 80 sweep along contact arrays 79 and 81, to detect any other pulses present in the scan $S_1$. Any pulse or magnetic mark encountered triggers unit 77 to apply to intensity electrode 75 the then-existing voltage of sawtooth 74, the beam being positioned at the location corresponding to the matching detector 16 by the then-existing voltages on electrodes 84 and 85. As tape 69 continues to move past head array 70, the marks in scan $S_2$ are detected at their corresponding channel positions, and the now greater voltage of sawtooth generator 74 produces a correspondingly different illumination of the face of cathode-ray tube 76 at the corresponding positions. This process continues until the final scan $S_L$ passes under head array 70, when the hologram or at least that portion of it represented by the detector array 17 has been recorded on the film of camera 86. It will be understood that the voltage output of sawtooth generator 74 must differ somewhat from the conventional sawtooth voltage in that, in order to produce the proper gray scale on the face of cathode-ray tube 76, the generator must reach its maximum voltage during the particular scan S when the phase is 180°, and thereafter the voltage must decrease linearly to its initial zero value for the relative phase of 360° which is equivalent to 0° phase.

While the contactors 42, 78 and 80 have been illustrated as mechanical switches, this is only to simplify the explanation of the invention, as these will ordinarily be semi-conductor devices well known in the computer and related arts as high speed switches.

While the reference signal in this embodiment has been shown as derived directly from oscillator 18, it may alternatively be provided in other ways, such as from the received transducer signals as taught in my U. S. Pat. No. 3,450,225. Also, while the various circuit components of the system have been shown only in block-diagram form, all of these are well known in the art and are available as separate articles of commerce, so that no further detailed description of them is deemed necessary.

While I have illustrated a system in which the source and the detectors are stationary with respect to the object, this invention can be applied equally well to systems in which either the source or the detectors, or both, are scanned over the hologram area, above the object. For the case shown in FIG. 1 where all of the detectors and the source are stationary and all of the detectors are scanned at one time, it is possible to use one of the detector signals as the reference since all that is required is the relative phase between each of the detectors. Where the number of detector positions is greater than the number of detector channels available, then the detectors must be recorded in sequential groups, and a reference signal as shown in FIGS. 1 and 2 is required to tie together the phase measurements made in successive groups.

While I have illustrated the utilization of the phase determinations in terms of spots in various positions in precisely determined values of gray scale, to form an optical hologram for optical reconstruction, it will be clear that the determined values of relative phase can equally well be utilized in other ways, such as computer reconstruction.

I claim:

1. In a method of recording elastic-wave holographic data provided by a plurality of elastic-wave detector signal channels and a reference signal of frequency $f$, said recording to be of a parameter related to the relative phases between said reference signal and the signal in each of said detector channels, there being $n$ channels and $L$ independent equal-time spaced determinations in one cycle of said reference signal, the improvement comprising the steps of
   amplifying and clipping each of said detector signals and said reference signal to provide corresponding square-wave signals,
   differentiating each of said square-wave signals to provide brief voltage pulses at each zero-axis crossing of each of said signals,
   shaping each of said brief pulses of a given polarity into square-wave pulses of time duration $M=1/fL$,
   at a time of about $M/2$ following brief pulse of said reference signal, scanning each of said signal channels in sequence for the presence or absence of one of said square-wave pulses,
   recording on a record medium in the sequence of scanning said channels, an indication of the presence of square-wave pulses when they occur, and
   repeating said scanning and recording steps at each of a plurality of successive times $M$ time units apart, until at least a total of $L$ such scans have been completed and recorded.

2. In elastic-wave phase holography wherein are recorded indications of the relative phases of coherent elastic waves of period $T$ received by a plurality $n$ of transducers which convert said elastic waves to electrical signals, said transducers being spread over a hologram area, the improvement comprising the steps of
   amplifying and clipping each of said $n$ transducer signals to produce corresponding square-wave signals,
   differentiating said square-wave signals to produce brief positive and negative pulses at the zero-axis crossings of said square-wave signals,
   selecting said brief pulses of one polarity and shaping said selected pulses into square-wave pulses of duration $M = T/L$ where $L$ is an integer equal to the number of phase-angle intervals into which said period $T$ is subdivided for determining said relative phases,
   for at least $L$ successive times spaced $M$ seconds apart during at least one period $T$ of said coherent waves, sampling the square-wave pulse outputs of said $n$ transducers to detect the presence of said square-wave pulses, and
   following each sampling, and in a sequence related to the position of the corresponding transducer in said hologram area, recording an indication of the occurrence of each square-wave pulse in said sample, there being a range of relative phase angles and a corresponding hologram parameter associated with each sample.

3. In elastic-wave phase holography, the improvement as in claim 2 in which said coherent elastic waves are generated in response to the output of a constant-frequency control oscillator and including the further steps of deriving a reference signal from the output of said oscillator, clipping said reference signal to produce a corresponding reference square-wave, differentiating said reference square wave to produce brief reference pulses coincident with the zero-axis crossings of said reference signal, and employing one of said brief reference pulses to initiate the first of said $L$ successive samplings of said $n$ transducer square-wave pulse outputs.

4. In elastic-wave phase holography, the improvement as in claim 2 in which said coherent elastic waves are generated in response to the output of a constant-frequency control oscillator of period $T$ and including the further steps of deriving a reference signal from the output of said oscillator, multiplying said reference signal by the integral factor $L$ to produce a constant-frequency sampling-control signal of period $M = T/L$, and employing said sampling-control signal to initiate each of said $L$ successive samplings of said $n$ transducer square-wave pulse outputs.

5. In elastic-wave phase holography, the improvement as in claim 2 in which said step of recording comprises the step of reproducibly recording a quantity related to the occurrence of each square-wave pulse in said sample.

6. In elastic-wave phase holography, the improvement as in claim 5 including the additional steps of reading the reproducible recording of said quantity, and plotting on a record medium, in a position related to the position in said hologram area of the corresponding transducer, a quantity related to the occurrence of each square-wave pulse in said sample.

7. In elastic-wave phase holography, the improvement as in claim 6 in which said quantity plotted in each position on said medium is an area of gray-scale value related to the relative time of occurrence of the square-wave pulse in the coherent-wave cycle.

8. In elastic-wave phase holography, the improvement as in claim 5 in which said step of reproducibly recording comprises the steps of recording on a single track successive arrays of spots, each array comprising spots corresponding to the presence of square-wave pulses on sequentially sampled channels, and each successive array corresponding to one of said $L$ samplings.

9. In elastic-wave phase holography, the improvement as in claim 5 in which said step of reproducibly recording comprises the steps of recording on each of multiple tracks, one corresponding to each of the transducer signal channels, at a time corresponding to one of the $L$ successive samplings, a mark corresponding to the presence of a square-wave pulse in said channel.

10. In elastic-wave phase holography employing a holographic detecting array of $n$ electrical transducers in an elastic-wave transmitting medium, each of said transducers acting to convert coherent elastic-wave energy of period $T$ incident thereon into $n$ corresponding electrical signals, the improved multiple-channel system for recording indications of the relative phases of said signals comprising $n$ signal-channel means to amplify and clip each of said transducer electrical signals to produce corresponding square-wave signals, means to differentiate and rectify said square-wave signals to produce a brief pulse at each alternate zero-axis crossing of each of said square-wave signals of a given polarity, means to shape said brief pulses into square-wave pulses of duration $M = T/L$ seconds where $L$ is an integer equal to the number of phase-angle intervals into which said period $T$ is subdivided for determining said relative phases, means to sample, for at least $L$ successive times spaced in time by $M$ seconds, all of the outputs of said signal channels to detect the presence of said square-wave pulses, and means to record, as a function of detector position in said array and corresponding channel position in the order of sampling, an indication for each of said $n$ channels as to which of said $l$ samples contained the corresponding square-wave pulse.

11. An improved recording system for elastic-wave phase holography as in claim 10 including also means to display, as gray-valued spots in positions related to the positions of the corresponding transducers in said array, said indications of square-wave pulse occurrence, the said gray value being related to the sequential number of sample in said succession of $L$ samples.

* * * * *